US012305403B2

(12) United States Patent
Marin Rodriguez

(10) Patent No.: US 12,305,403 B2
(45) Date of Patent: May 20, 2025

(54) FOLDABLE STRUCTURE FOR A SUNSHADE, A SHUTTER OR A FENCE

(71) Applicant: Francisco Javier Marin Rodriguez, Santa Maria de Palautordera (ES)

(72) Inventor: Francisco Javier Marin Rodriguez, Santa Maria de Palautordera (ES)

( * ) Notice: Subject to any disclaimer, the term of this patent is extended or adjusted under 35 U.S.C. 154(b) by 368 days.

(21) Appl. No.: 17/793,575

(22) PCT Filed: Jan. 21, 2021

(86) PCT No.: PCT/EP2021/051279
§ 371 (c)(1),
(2) Date: Jul. 18, 2022

(87) PCT Pub. No.: WO2021/148507
PCT Pub. Date: Jul. 29, 2021

(65) Prior Publication Data

US 2023/0101839 A1 Mar. 30, 2023

(30) Foreign Application Priority Data

Jan. 23, 2020 (EP) .................................... 20382037

(51) Int. Cl.
*E04F 10/10* (2006.01)
*E04H 17/14* (2006.01)
*E06B 9/06* (2006.01)

(52) U.S. Cl.
CPC .......... *E04F 10/10* (2013.01); *E04H 17/1445* (2021.01); *E06B 9/0638* (2013.01); *E06B 9/0676* (2013.01)

(58) Field of Classification Search
CPC .... E04F 10/10; E04H 17/1445; E06B 9/0638; E06B 9/0676; E06B 9/0607; E06B 9/02
See application file for complete search history.

(56) References Cited

U.S. PATENT DOCUMENTS 6,651,724 B1 * 11/2003 Cittadini ............... E06B 9/0638 160/36
9,145,732 B2 * 9/2015 Frigerio .................. E04B 7/166
(Continued)

FOREIGN PATENT DOCUMENTS

EP 3024997 B1 * 11/2017 .............. E04F 10/10
WO WO-2017109165 A1 * 6/2017

*Primary Examiner* — Beth A Stephan
(74) *Attorney, Agent, or Firm* — Eugenio J. Torres-Oyola; Victor M. Rodriguez-Reyes; Rafael Rodriguez-Muriel

(57) ABSTRACT

A foldable structure for a sunshade, a shutter or a fence, comprising at least one guiding member (10); a plurality of displaceable elements (20) slidably connected to said guiding member (10) forming a row (2), a stroke end (54), a first actuator (31) connected to fist displaceable element (20) of the row (2), foldable spacers (40) connecting each pair of successive displaceable elements (20), and a spacer guide (50) including successive first portion (51), second portion (52), third portion (53), wherein the second portion (52) urge the foldable spacers (40) from a first folding position to a second folding position; and wherein a second actuator (32) produces a relative movement between the second portion (52) of the spacer guide (50) and the stroke end (54) to adjust the longitude of the third portion (53), said second actuator (32) being in coordination with the first actuator (31).

15 Claims, 4 Drawing Sheets

(56) References Cited

U.S. PATENT DOCUMENTS

| | | | | |
|---|---|---|---|---|
| 10,094,122 | B1 * | 10/2018 | Akbulut | E04B 7/163 |
| 2017/0138057 | A1 * | 5/2017 | Ventrella | E04F 10/10 |
| 2018/0106046 | A1 * | 4/2018 | Castel | E04F 10/10 |
| 2019/0145107 | A1 * | 5/2019 | Byszenski | E04F 10/10<br>160/62 |

* cited by examiner

FOLDABLE STRUCTURE FOR A SUNSHADE, A SHUTTER OR A FENCE

TECHNICAL FIELD

The present invention is directed to a foldable structure, for example a sunshade or a shutter preferably made of slats, or a fence made of vertical or horizontal elongated elements, among other uses.

The proposed foldable structure includes a plurality of displaceable elements separated to each other which can be collapsed by reducing the distance among them.

STATE OF THE ART

Many different foldable structures are known for its use as a sunshade, shutter or fence. For example, document US2019145107A1 describe a sunshade including multiple parallel displaceable slats. On this document, each slat is connected to the next slat by means of two hinged arms. Those hinged arms are kept horizontally stretched by a blocking mechanism that prevents the folding thereof when required and an unlocking mechanism which produces the folding of the two hinged arms when required, producing the reduction of the distance between adjacent slats.

Document WO2017109165A1 describes a shutter in which each slat is guided, on each end, on two parallel guides, and the angle of all the slats can be adjusted by modifying the distance between said two parallel guides. Each slat is connected to the following slat by two hinged arms. The two hinged arms are contained within a first portion of one of said guides, retaining said two hinged arms in a stretched position, maintaining the two adjacent slats at a predefined first distance. The slats can be stored in an accumulation area where the slats can be moved and stored in a folded manner with a reduced distance there between.

Said accumulation area is adjacent to a stroke end which limits the stroke of the displaceable slats. On said accumulation area the two hinged arms can be folded, reducing the distance between the adjacent slats, because the guide which retain the two hinged arms in the stretched position finishes at a distance from said accumulation area. When the slats are moved to the accumulation area, the two hinged arms exit the guide and, because the slats cannot proceed with the displacement when reaching the stroke end, the two articulated arms contained in the accumulation area and not retained by the guide are urged to a folded position, reducing the distance between the slats accumulated on the accumulation area.

In the solution described on this document the accumulation area shall be dimensioned to contain all the slats in a stored position. According to this solution the guide where the hinged arms are contained and retained in the stretched position, ends previous to the accumulation area and in the accumulation area the hinged arms are not guided. Therefore, within the accumulation area, the folding of the hinged arms is not produced in a controlled manner and can occur at any position within the accumulation area or can occur only partially. The complete folding of all the hinged arms, producing a complete collapse of all the slats, only occurs when the accumulation area is full of slats therefore, according to this solution the folding of the slats is not produced in a controlled manner.

Document EP3024997B1 describes a sunshade in which successive displaceable slats are connected to geared arms forming a zigzagging chain. The arms are connected through gears which determine a uniform folding and unfolding of the entire chain of geared arms, so the distance between adjacent slats remains uniform in the entire sunshade while folding or unfolding it. Because the chain of geared arms includes many gear transmissions, an extreme precision in the fabrication of said geared arms is required, increasing its cost, to obtain a precise and uniform movement because small play between connected gears, accumulated along the entire chain, can produce an apparent irregular movement of the slats.

None of the cited documents provide a solution to produce the uniform displacement of a row of displaceable elements producing a folding only of the displaceable elements which reach the accumulation area adjacent to the stroke end in a controlled manner using a simple, cheap and reliable mechanism. Those and other problems are solved by the present invention.

Document U.S. Pat. No. 6,651,724 describe a foldable blind on which the successive slats are articulated to each other through a link element. Those link elements allow a relative movement between successive slats between a retracted position, in which no separation between successive slats exists, and an extended position which creates a separation between the slats and allow the stacking of two successive slats face to face when are accumulated in a staked manner. Those link elements produce a loose connection between the blinds and an inconsistent spacing between slats if not used in vertical direction.

BRIEF DESCRIPTION OF THE INVENTION

The present invention is directed to a foldable structure, which can be used for example for a sunshade, a shutter or a fence.

A foldable structure is a structure which can reduce its size or surface in a controlled manner by reducing the distance between at least some of their constitutive elements, and which can later recover its original size or surface in a controlled manner by increasing the distance between said constitutive elements.

The proposed foldable structure comprises, in a manner already known in the state of the art, the following elements:

- at least one guiding member defining a guiding path;
- a plurality of displaceable elements slidably connected to said at least one guiding member in succession forming a row of displaceable elements;
- a stroke end limiting the movement of the displaceable elements on one end of said guiding path;
- a first actuator connected to the displaceable element of the row of displaceable elements more distant from the stroke end, to produce the sliding movement of said displaceable element in a folding direction and in an unfolding direction following the guiding path;
- a spacer device comprising
  - foldable spacers connecting each pair of successive displaceable elements of the row of displaceable elements to each other keeping said pair of successive displaceable elements at a distance, each foldable spacer being movable between a first folding position determining a first distance between said pair of successive displaceable elements and a second folding position determining a second distance between the pair of successive displaceable elements smaller than the first distance, and
  - a spacer guide including successive first portion, second portion, third portion, wherein the first portion is parallel to the guiding path and configured to guide and retain the foldable spacers in the first folding position, and wherein the third portion is adjacent to the stroke end and is configured to guide and retain the foldable spacers in the second folding position, determining an accumulation area adjacent to the stroke end where a number of displaceable elements of the row of displaceable elements are accumulated in a folded position;

According to that, a plurality of displaceable elements are arranged in succession determining a row of displaceable elements with two extreme displaceable elements and multiple intermediate displaceable elements interposed between said two extreme displaceable elements.

At least one guiding member supports the displaceable elements, permitting the sliding movement of said displaceable elements along the at least one guiding member, said guiding member acting as a track for said displaceable elements. The at least one guiding member determine the trajectory of said sliding movement of the displaceable elements. Said trajectory is named guiding path. A stroke end limits on one end the sliding movement of the displaceable elements along the guiding path.

So, each displaceable element is connected to the at least one guiding member in a sliding manner, permitting the sliding movement of each of said displaceable elements along the at least one guiding member.

One of said two extreme displaceable elements of the row of displaceable elements is more distant from the stroke end than the other displaceable elements of the row, and it is connected to a first actuator which moves said displaceable element extreme from the row along the guiding path in a folding direction, reducing its distance with the stroke end, or in an unfolding direction opposed to the folding direction, increasing its distance with the stroke end.

The proposed foldable structure further comprises a spacer device comprising foldable spacers and a spacer guide.

The foldable spacers are spacers interposed between and connected to successive displaceable elements of the row of displaceable elements. Each foldable spacer can be placed in a first folding position keeping said successive displaceable elements at a first distance, or in a second folding position keeping said successive displaceable elements at a second distance, being both first and second distances measured from the center of one displaceable element to the center to the following displaceable element. The second distance is smaller than the first distance therefore, the displaceable elements connected to each other through folding spacers retained in the second folding position are closer to each other, and therefore in a folded position, in comparison with the displaceable elements connected to each other through folding spacers retained in the first folding position, and therefore in an unfolded position.

The spacer guide permits the sliding movement of the foldable spacers along its longitude, acting as a track, and interact with said foldable spacers to determine the first folding position or the second folding position of each folding spacer depending on its position along the spacer guide.

The spacer guide includes successive first portion, second portion and a third portion.

The first portion is parallel to the guiding path and the folding spacers guided therein are urged and retained in the first folding position. The third portion is adjacent to the stroke end, i.e. closer to the stroke end than the first portion and the second portion of the spacer guide, and the folding spacers guided therein are retained in the second folding position. All the displaceable elements connected to foldable spacers guided by the third portion are in the folded position and are stored in the accumulation area adjacent to the stroke end, while the displaceable elements connected to foldable spacers guided by the second portion are separated an intermediate distance between the first and the second distance and therefore not yet stored in the accumulation area. Therefore, said accumulation area is defined between the stroke end and the last displaceable element associated with a foldable spacer guided by the third portion, typically said accumulation area being defined by the longitude of the third portion, in the guiding path direction, between the end of the second portion and the stroke end.

When the first actuator moves the first displaceable element of the row of displaceable elements to which it is connected in the folding direction, all the row of displaceable elements is moved towards the stroke end, being the distance between the different displaceable elements keep by the successive foldable spacers connected thereto. When one last displaceable element of the row of displaceable elements closer to the stroke end reaches the stroke end, it cannot further be moved along the guiding path, and the first displaceable element can only keep moving in the folding direction if the distance between at least some of the displaceable elements is reduced, causing the folding of the structure and the reduction of the longitude of the row of displaceable elements. The displaceable elements which folding spacers are in the first portion of the spacer guide cannot be folded from the first folding position to the second folding position, only those displaceable elements which folding spacers reach the third portion, after passing through the second portion, are folded reducing the distance between two successive displaceable elements from the first distance to the second distance.

The present invention proposes, in a manner not known from the available state of the art, the following additional features:

- each foldable spacer comprises a first arm freely articulated to one displaceable element and a second arm freely articulated to the following displaceable element of the row of displaceable elements, said first and second arms being freely articulated to each other;
- the second portion of the spacer guide is configured to guide and urge the foldable spacers from the first folding position to the second folding position during the driving produced by the first actuator in the folding direction and from the second folding position to the first folding position during the driving produced by the first actuator in the unfolding direction; and
- a second actuator produces a relative movement between the second portion of the spacer guide and the stroke end to adjust the longitude of the third portion to the number of displaceable elements accumulated in the accumulation area, said second actuator being in coordination with the first actuator.

In other words, the second portion of the spacer guide urges the folding or unfolding of the folding spacers being guided there through, determining a reduction or an increase in the distance between two successive displaceable elements when the respective folding spacer is guided through said second portion.

A second actuator is configured to produce a relative movement between the second portion and the stroke end, producing a modification of the longitude of the third portion of the spacer guide. The total longitude of the row of displaceable elements depends on the number of foldable spacers placed on the first folding position and in the second folding position. While the row of displaceable elements is moved in the folding direction by the first actuator, more foldable spacers reach the second portion and later the third portion, reducing the total longitude of the row of displaceable elements. The second actuator is coordinated with the first actuator to adapt the longitude of the third portion and of the accumulation area to the variable distance between the first displaceable element connected to the first actuator and the last displaceable element in contact with the stroke end. When the last displaceable element of the row of displaceable elements is in contact with the stroke end, the longitude of the row of displaceable elements shall be equal to the distance between the first displaceable element connected to the first actuator and the stroke end during the displacement of the first displaceable element connected to the first actuator in the folding direction.

This relative movement produced by the second actuator can be achieved by moving the second portion, modifying the point of the guiding path where the distance between two successive displaceable elements is changed from the first distance to the second distance or vice versa, producing an increase in the accumulation area without increasing the total longitude of the guiding path.

Alternatively, this relative movement can be achieved by moving the stroke end, in which case the point of the guiding path where the distance between two successive displaceable elements is changed remains the same, but the accumulation area is increased elongating the total longitude of the guiding path.

A mixed solution of the two previously described solutions is also contemplated.

The longitude of the foldable spacer depends on the angle formed between the two articulated arms, being maximal when the angle is of 180° or close to 180°, for example bigger than 150°, and being minimal when the angle is of 0° or close to 0°, for example smaller than 30°.

According to an additional embodiment, the second portion is a cam and each foldable spacer include a cam follower complementary to said cam. When the foldable spacers are moved through the second portion, correspondent cam followers interact with the second portion urging the folding or unfolding of the foldable spacer from the first folding position to the second folding position or from the second folding position to the first folding position. It will be understood that the cam can be a linear groove, in which case the cam follower is a pin inserted on said linear groove, or alternatively the cam can be a linear protrusion, in which case the cam follower will be a sliding element connected said linear protrusion to slide along the linear protrusion following its path.

The cam follower can be located, for example, on the articulation between the first and second arms. Urging this point in a direction transverse to the guiding path, preferably in a vertical direction, can produce the modification of the folding position of the foldable spacers.

The foldable spacers include the first and second arms freely articulated described above. According to this preferred embodiment, the first portion and the third portions of the spacer guide will be preferably parallel to the guiding path and the second portion will connect said first and third portion through a ramp non-parallel to the guiding path. Said ramp can be a straight linear ramp or preferably a curvy shaped ramp for example following a sinusoidal path.

According to one embodiment of the present invention, the second portion and at least a portion of the first and the third portions adjacent to said second portion are included in a movable spacer guide, said movable spacer guide being slidably guided in a direction parallel to the guiding path and being actuated by said second actuator, permitting the movement of the second portion in regard to the stroke end and the modification of the longitude of the third portion and of the accumulation area.

In such case, a portion of the first portion and/or a portion of the third portion can be telescopically connected to the movable spacer guide, permitting the modification of the longitude of the first and/or the third portions.

The coordination between the first actuator and the second actuator will preferably determine that the time required by the first actuator to move the displaceable element to which is connected a distance equivalent to the difference between the first distance and the second distance is the same that the time required by the second actuator to produce a relative movement between the second portion and the stroke end the second distance.

In other words, if the first distance is for example five times the second distance, then the difference between the first distance and the second distance is four times the second distance. The first actuator displaces the first displaceable element to which it is connected at a velocity four times faster than the velocity at which the second portion and the stroke end are moved to each other. Of course, any other relation between the first and second distances different from five can be used, producing the same technical effect.

Also, it is proposed that the first actuator, the second actuator or both can produce a step by step displacement in which case the rule described above applies on the medium velocity of the displacement.

The first actuator and the second actuator can be coordinated through a gear box, a gear transmission or can be separated actuators coordinated through an electronic coordination which regulates their respective velocities.

When the second actuator produces the displacement of the second portion, said second portion is moved in a direction opposed to the direction of the displacement of the row of displaceable elements, but when the second actuator produces the displacement of the stroke end, then both the stroke end and the row of displaceable elements are moved in the same direction but at a different velocity.

The displaceable elements are preferably elongated in a direction transverse to the guiding path, or preferably are slats which preferably also extends in a direction transverse to the guiding path.

The foldable structure further comprises a drive shaft parallel to or integral of said at least one guiding member and wherein each displaceable element is an orientable slat connected to the drive shaft through a sliding carriage which includes a transmission configured to produce the rotation of the slat in response to the rotation of the drive shaft.

Said drive shaft can rotate on its axis, which is parallel to the guiding path, and includes recesses or protrusions on its surface which allow the sliding movement of the sliding carriages along the guiding path but on which the transmission can be engaged to rotate in response to the rotation of the drive shaft.

According to a preferred embodiment of the folding structure, said at least one guiding member comprises two parallel guiding members separated to each other, each displaceable element being supported on said two parallel guiding members on two opposed ends thereof.

In such case, each of said two guiding members can include a first actuator connected to the two opposed ends of the displaceable elements supported between said two parallel guiding members, the first actuator of both guiding members being coordinated to each other to produce uniform movement of both end of the displaceable elements. Alternatively, one single first actuator is simultaneously connected to the two opposed ends of the same displaceable element, said single first actuator being simultaneously integrated on both guiding members.

It is also contemplated that, when the foldable structure includes two guiding members, only one or alternatively both guiding members can include a spacer device. When both guiding members include a spacer device the relative movement between the stroke end and the second portion included on each of said two spacer devices can be performed by one single second actuator simultaneously connected to both second portions or to both stroke ends, or alternatively by two second actuators coordinated to each other to produce an uniform and coordinated movement.

Each end of the first displaceable element of the row of displaceable elements can be connected to a first actuator present on both guiding members, producing an uniform and simultaneous movement of said displaceable element, and also both guiding members can include a foldable spacers connecting the successive displaceable elements of the row of displaceable elements, and the spacer guide to determine the folding position and the unfolding position of each of said folding spacers.

According to an alternative embodiment of the present invention, the displaceable elements projects on both sides of the at least one guiding member. For example, a single guiding member can be placed in a central position and the displaceable elements can project on both sides of said central guiding member, preferably in a symmetrical manner.

It is also proposed that said at least one guiding member and the guiding path defined by said at least one guiding member can be curved.

Also, it is proposed the inclusion of a support structure for supporting the at least one guiding member and the spacer device.

Said support structure can comprise, for example, one beams parallel to the guiding path for each guiding member, said beam supporting one guiding member and optionally also one spacer device.

According to a preferred embodiment the support structure comprises two parallel beams, each supporting one guiding member and one spacer device, the displaceable elements being supported on said guiding member between the two parallel horizontal beams. Said two horizontal beams can be also connected to each other through connection beams and can be supported on columns.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF AN EMBODIMENT

The foregoing and other advantages and features will be more fully understood from the following detailed description of an embodiment with reference to the accompanying drawings, to be taken in an illustrative and not limitative.

According to the preferred embodiment of the present invention the foldable structure comprises a plurality of successive and parallel displaceable elements 20, which in this example are horizontal slats, forming a row 2 of displaceable elements 20.

Figure 1:
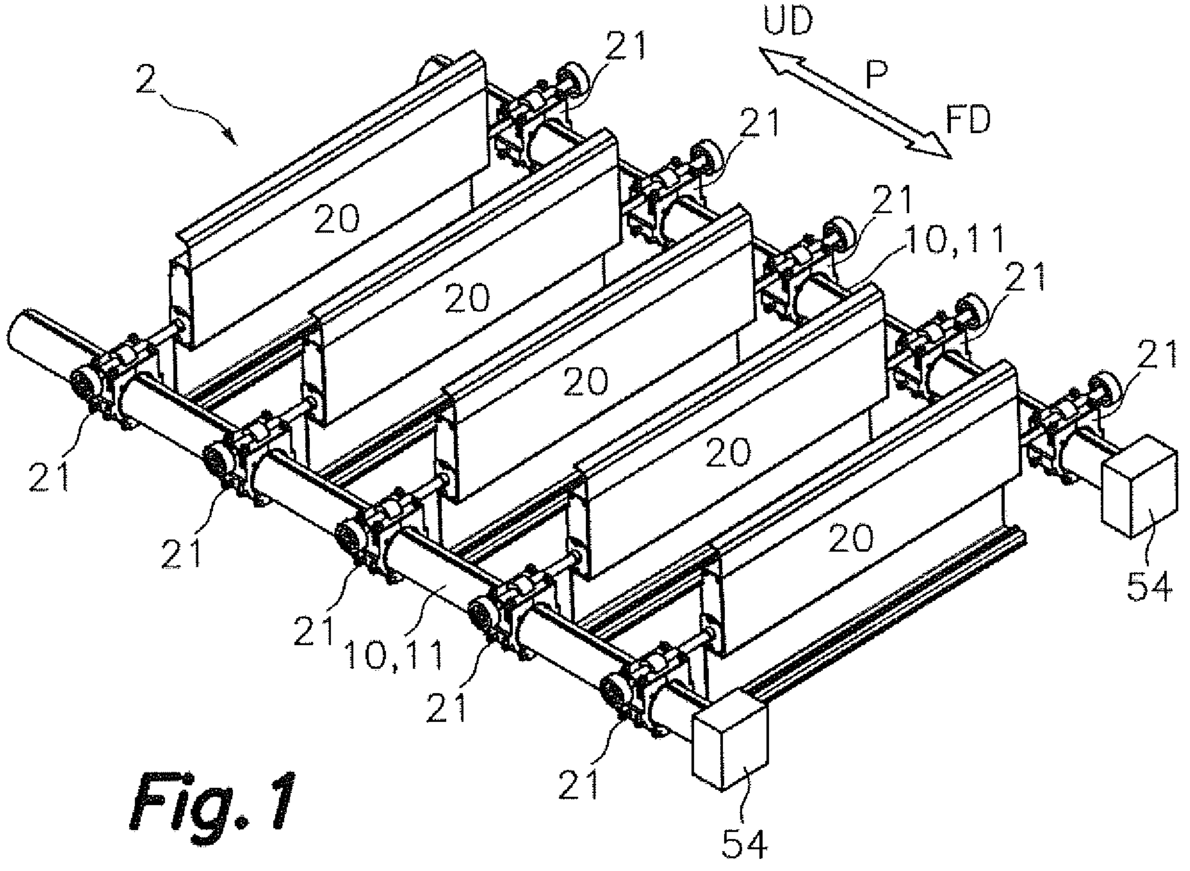
FIG. 1 shows a partial perspective view of a foldable structure according to an embodiment in which two parallel guiding members are two cylindrical drive shafts. Each displaceable element, of a row of displaceable elements, has two opposed ends supported on said two drive shafts through sliding carriages which further integrate a transmission which, when the drive shafts rotate along its axis parallel to the guiding path, produces the rotation of the displaceable elements along an axis perpendicular to the two guiding paths defined by both guiding members. In this view the spacer device, the first actuator and the second actuator are not shown in this figure for clarity reasons.
Figure 2:
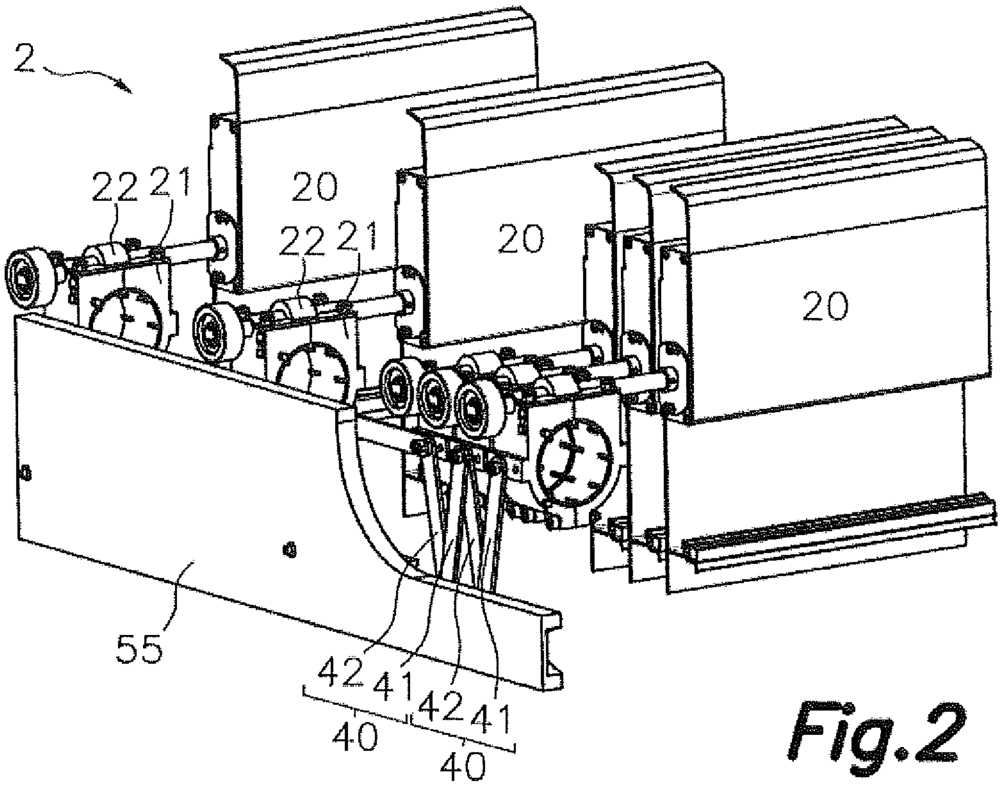
FIG. 2 shows a partial perspective view of a foldable structure according to an embodiment similar to that shown on FIG. 1, showing a spacer device comprising a spacer guide and foldable spacers each comprising a first and a second arms freely articulated. The drive shaft, the stroke end, the first actuator and the second actuator are not shown in this figure for clarity reasons.

Each displaceable element 20 has two opposed ends, each supported on a guiding member 10 in a sliding manner, so that each displaceable element 20 can slide along the guiding members following a guiding path P defined by said guiding members 10 until reaching a stroke end 54 which limits said guiding path P on one end. This embodiment is shown on FIG. 1.

In this example, at least one of the guiding members 10 comprises a drive shaft 11 which can rotate along its longest axis, parallel to the guiding path P. Each displaceable element 20 is connected to said drive shaft 11 through a sliding carriage 21 which can slide long the driving shaft 11 in the guiding path P direction, and which includes a transmission 22 engaged to said driving shaft 11 to rotate together with the driving shaft 11 producing the rotation of the displaceable element 20 connected thereto along an axis transversal to the guiding path P. When the driving shaft 11 rotates, for example actuated by a motor, all the displaceable elements 20 connected to said driving shaft 11, which in this example are slats, will rotate changing their inclination. The inclination of all the displaceable elements 20 shall be placed in an optimal position to proceed with the folding of the foldable structure, for example in a position perpendicular to the guiding path P, and the displaceable elements 20 can only be rotated in a position different from said optimal position when the row of displaceable elements 2 is completely unfolded.

The proposed foldable structure further comprises, associated with each guiding member 10, a spacer device which comprises foldable spacers 40 and a spacer guide 50. Different embodiments of the spacer device are shown on FIGS. 2 to 6.

Each foldable spacer 40 connects the ends of two successive displaceable elements 20 of the row 2 of displaceable elements 20, keeping said displaceable elements 20 at a first distance, measured from the center of one displaceable element to the center of the following displaceable element, when the foldable spacer 40 is in a first folding position, and keeping at a second distance smaller than the first distance when the foldable spacer 40 is in a second folding position, also measured from center to center.

In the preferred embodiment, shown on FIGS. 2 to 5*c*, each foldable spacer 40 comprises a first arm 41 freely articulated to one end of one displaceable element 20 and a second arm 42 freely articulated to one end of the following displaceable element 20 of the row 2 of displaceable elements 20, being the first and second arms 41 and 42 freely articulated to each other. In this case, the first folding position is when both first and second arms 41 and 42 are aligned or forming an obtuse angle close to 180°, preferably bigger than 150°, and the second folding position is when both first and second arms 41 and 42 are forming an acute angle close to 0°, preferably smaller than 30°.

It will be understood that the arm is a bar defined between the articulation points, independently of the shape of the element constitutive of said arm.

The foldable spacers 40 are associated with a spacer guide 50, in this case by a cam follower placed in the articulation between the first and the second arms 41 and 42 and inserted in said spacer guide 50 which acts as a cam.

When the displaceable elements 20 are moved along the guiding path P, the foldable spacers 40 connected to them are also moved following the guiding path P, sliding the cam follower along the spacer guide 50.

The spacer guide 50 include successive first portion 51, second portion 52 and third portion 53. The first portion 51 is parallel to the guiding path P and is configured to retain all the foldable spacers 40 associated with said first portion 51 in the first folding position. The third portion 53 is closer to the stroke end 54 than the other segments of the spacer guide 50 and is configured to retain the folding spacers 40 associated therewith in the second folding position. The second portion 52 is interposed between the first and the third portions 51 and 53 and is configured to urge the foldable spacers 40 from the first folding position to the second folding position or vice versa when passing therethrough.

According to this construction, when the row 2 of displaceable elements 20 is moved along the guiding path in a folding direction FD to the stroke end 54, the foldable spacers 40 are retained in the first folding position when remain in the first portion 51 keeping the displaceable elements 20 separated a first distance, but when the folding spacers 40 pass through the second portion 52 and reach the third portion 53 they are urged to the second folding position by the spacer guide 50, reducing the distance between the displaceable elements 20 stored in an accumulation area adjacent to the stroke end 54 to a second distance smaller than the first distance. In an equivalent manner, when the row 2 of displaceable elements 20 are moved along the guiding path in an unfolding direction UF opposed to the folding direction FD, the opposed effect is produced increasing the distance between the successive displaceable elements 20 when passing from the third portion 53 to the first portion 51.

The displacement of the row 2 of displaceable elements 20 along the guiding path P is produced by a first actuator 31 connected to a first displaceable element 20 of the row 2 of displaceable elements 20 more distant from the stroke end 54. In this example the first actuator 31 include a motor connected to an annular chain or an annular band parallel and adjacent to the guiding member 10, shown on FIGS. 4*a*, 4*b* and 4*c*, being the displaceable element 20 connected to said annular chain or band. When the motor is activated the chain or band pulls the displaceable element 20 along the guiding path P in the folding direction FD or in the unfolding direction UD.

Figure 3:
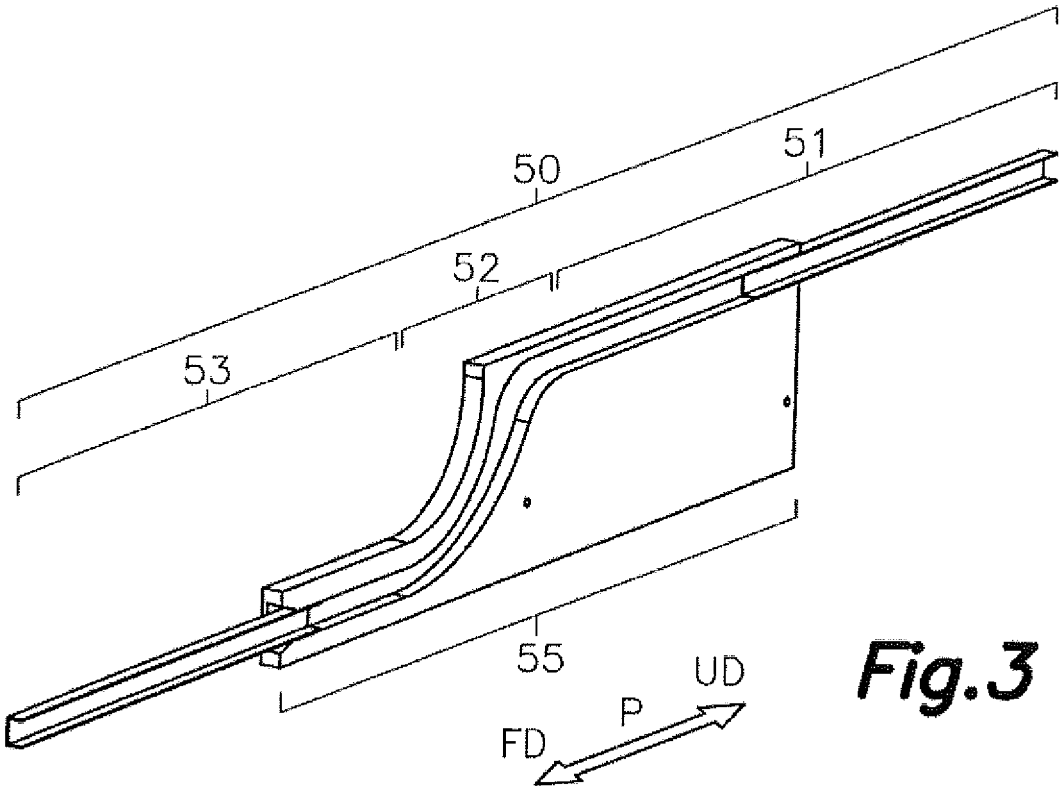
FIG. 3 shows a perspective view of the spacer guide according to an embodiment in which said spacer guide include a movable spacer guide comprising the second portion and a portion of the first portion and a portion of the third portion, being said movable spacer guide movable in regard to the rest of the first portion and the rest of the third portion by the second actuator, and being the rest of the first portion and the rest of the third portion telescopically connected to said movable spacer guide to allow said movement of the spacer guide but maintaining the continuity of the spacer guide.
Figure 4A:
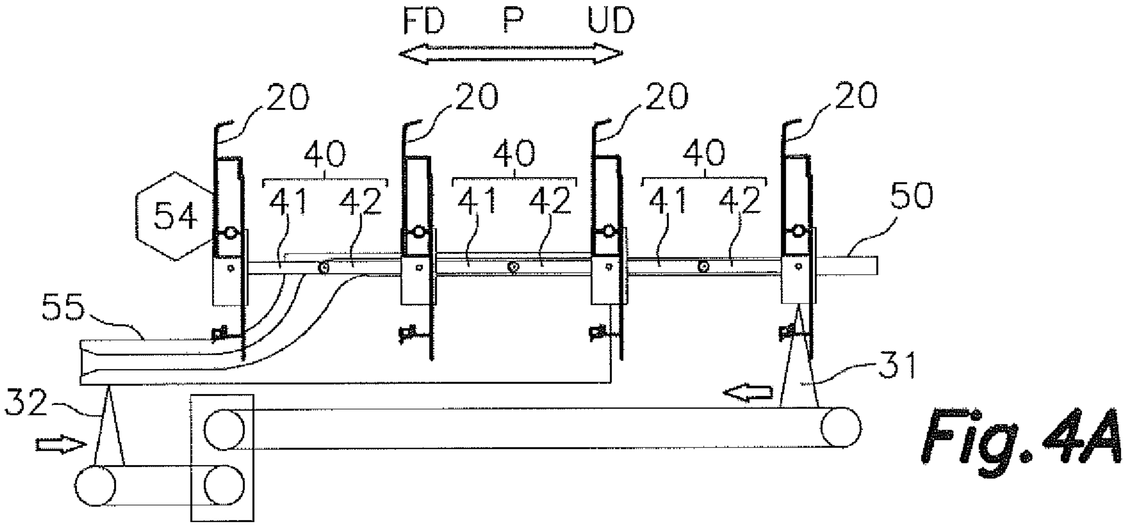
FIGS. 4*a*, 4*b* and 4*c* shown a lateral view, in three different folding positions, of the foldable structure according to an embodiment which includes a row of four displaceable elements, three foldable spacers, each comprising a first and a second arms freely articulated, connecting said four displaceable elements, a spacer guide with a first, second and third portions and a stroke end, wherein the first displaceable element of the row is connected to a first actuator comprising an annular band, a movable spacer guide, which is connected to a second actuator comprising an annular band for moving said movable spacer guide in a direction parallel to the guiding path, integrates the second and third portions and a part of the first portion of the spacer guide, the first actuator and the second actuator being coordinated through a mechanical transmission, shown in this figure in a simplified manner as a box connecting the annular bands of both first and second actuators.
Figure 4B:
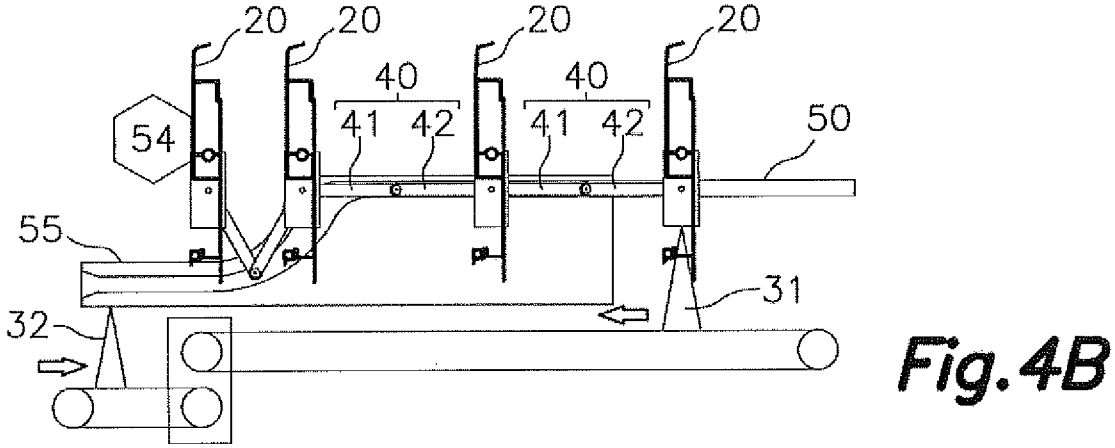
Figure 4C:
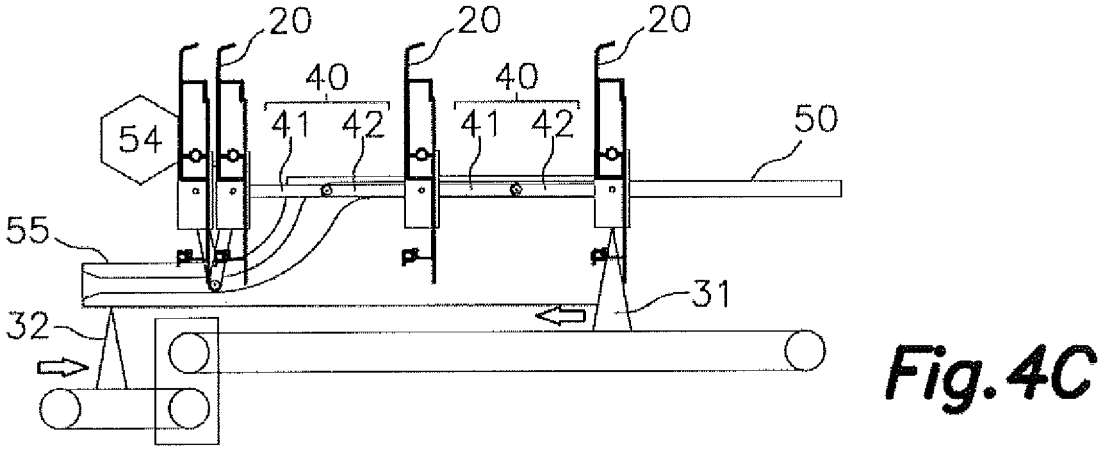

According to the embodiment shown on FIGS. 4*a*, 4*b* and 4*c*, the second portion 52, the third portion 53 and also a portion of the first portion 51 of the spacer guide 50 adjacent to the second portion 52 are integrated in a movable spacer guide 55. The portion of the first portion 51 integrated in the movable spacer guide 55 is telescopically connected to the rest of the first portion 51, allowing the relative movement between them and maintaining the continuity of the spacer guide 50. In FIG. 3 an alternative embodiment is shown in which also a part of the third segment 53 is telescopically connected to the movable spacer guide 55 which only comprises a part of said third portion 53 of the spacer guide 50.

The movable spacer guide 55 is connected to a second actuator 32 which produces the movement of the movable spacer guide 55 in a direction parallel to the guiding path P, as shown in FIGS. 4*a*, 4*b* and 4*c*. This movement produces an approach or a retreat of the second portion 52 to the stroke end 54, changing the longitude, in the direction parallel to the guiding path, of the third portion 53 comprised between the second portion 52 and the stroke end 54, which determines the size of the accumulation area where the displaceable elements 20 with respective foldable spacers 40 in the second folding position are accumulated.

In the example shown on FIGS. 4*a* to 4*c*, the second actuator 32 comprises an annular chain or an annular band connected to the same motor which actuates the first actuator 31 through a gear box with a transmission relation adapted to produce the adequate coordination between the first actuator 31 and the second actuator 32, said transmission being shown in as simplified manner as a box connecting both annular chains or annular bands in the drawings.

When the row 2 of displaceable elements 20 is completely unfolded, with all the foldable spacers 40 associated with the first portion 51 placed in the first folding position, but said row 2 still being in contact with the stroke end 54, the distance between the second portion 52 and the stroke end 54 is minimal, with a size equal or smaller than the space occupied by one single displaceable element 20.

As the first actuator 31 pushes the displaceable elements 20 in the folding direction FD against the stroke end 54, and the last displaceable element 20 of the row of displaceable elements 20 reaches the stroke end 54, the foldable spacer 40 connecting said last displaceable element 20 with the adjacent displaceable element 20 reach the second portion 52 of the spacer guide 50.

The movement of the second portion 52 produced by the second actuator 32, increasing its distance with the stroke end 54, produces the folding of the foldable spacer 40 associated therewith from the first folding position to the second folding position, and reduces the distance between the two adjacent displaceable elements 20, until said foldable spacer 40 is completely folded in the second folding position and reaches the third portion 53 by the movement of the movable spacer guide 55. At this point, the distance between the stroke end 54 and the second portion 52 determine an accumulation area adequate to store two displaceable elements 20 close to each other with the interposed foldable spacer 40 in the second folding position.

Because the reduction of the distance between said two adjacent displaceable elements 20, the total longitude of the row 2 of displaceable elements 20 is reduced, permitting the displacement of the displaceable elements 20 with respective foldable spacers 40 associated with the first portion 51 of the spacer guide 50 in the folding direction FD despite that the displaceable element 20 in contact with the stroke end 54 cannot proceed its movement in the folding direction FD.

This process continues with the successive displaceable elements 20, moving the second portion 52 away from the stroke end 54, increasing the size of the accumulation area and increasing the number of displaceable elements 20 close to each other with the interposed foldable spacer 40 in the second folding position accumulated in said accumulation area.

To obtain a smooth folding of the foldable structure the first actuator 31 and the second actuator 32 shall be coordinated to ensure that the velocity of the displacement of the row 2 of displaceable elements 20 is in coordination with the velocity of the movement of the second portion 52 and therefore with the velocity of the increase of the accumulation area where the displaceable elements 20 of the row 2 of displaceable elements 20 shall be stored.

The time needed by the first actuator 31 to move the first displaceable element 20 connected to the first actuator 31 a distance equivalent to the difference between the first distance and the second distance is the same time needed by the second actuator 32 to move the second portion the second distance in an opposed direction.

Figure 5A:
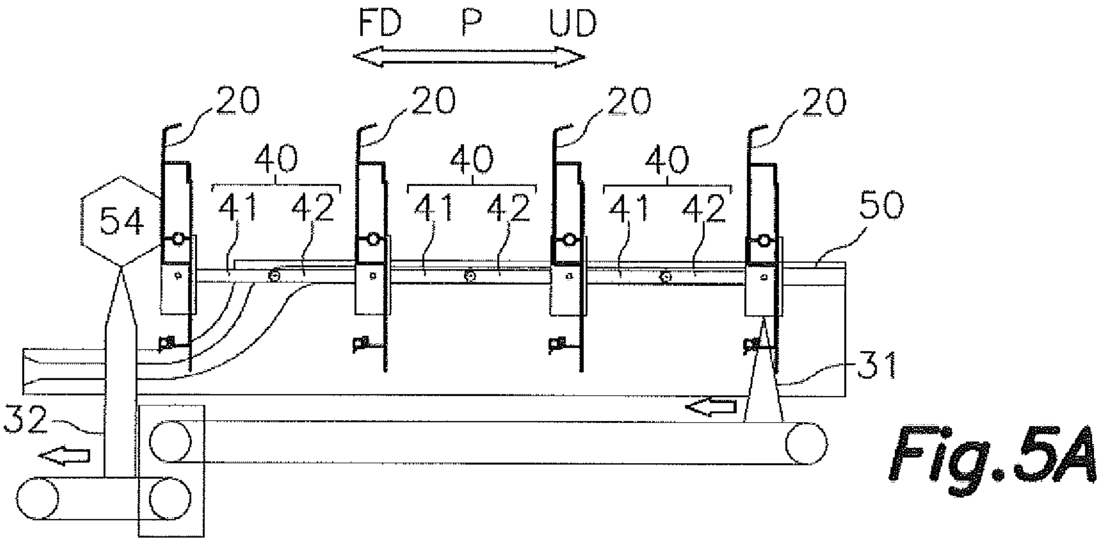
FIGS. 5*a*, 5*b* and 5*c* shown a lateral view, in three different folding positions, of the foldable structure according to an embodiment which includes a row of four displaceable elements, three foldable spacers, each comprising a first and a second arms freely articulated, connecting said four displaceable elements, a spacer guide with a first, second and third portions and a stroke end, wherein the first displaceable element of the row is connected to a first actuator comprising an annular band, the stroke end is connected to a second actuator comprising an annular band for moving said stroke end in a direction parallel to the guiding path, the first actuator and the second actuator being coordinated through a mechanical transmission, shown in this figure in a simplified manner as a box connecting the annular bands of both first and second actuators.
Figure 5B:
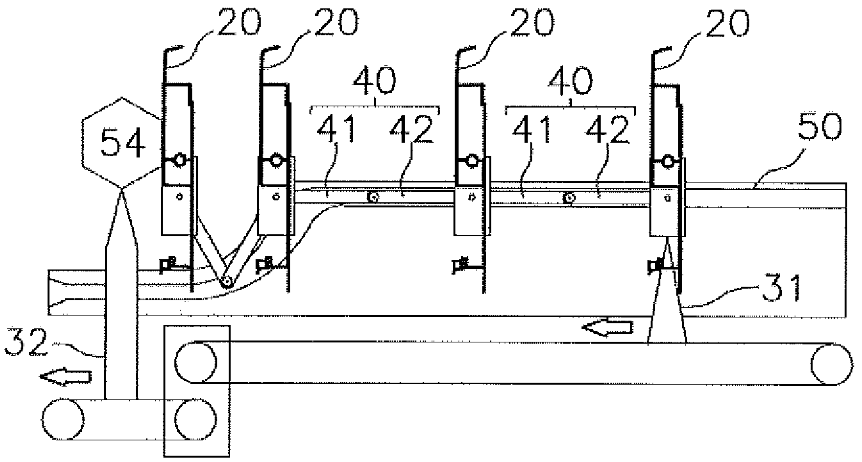
Figure 5C:
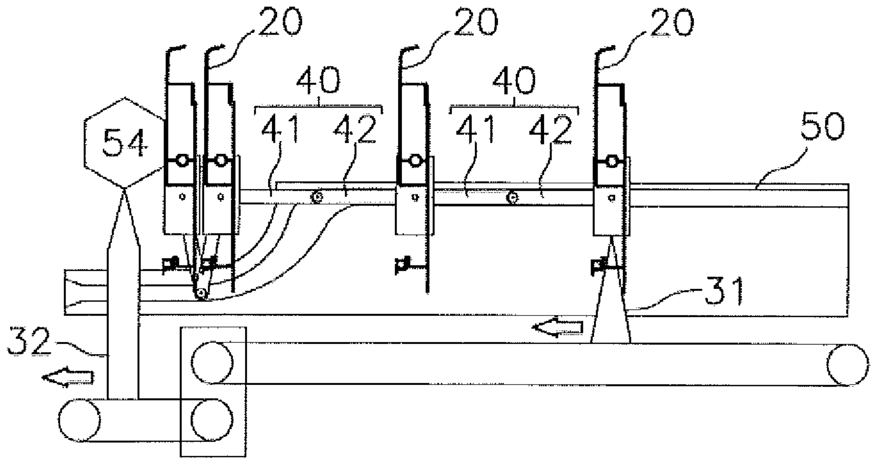

According to an alternative embodiment shown in FIGS. 5*a* to 5*c*, the second actuator is not connected to any part of the spacer guide, which is static, but to the stroke end 54, producing a movement of said stroke end 54 in the folding direction FD or in the unfolding direction UD, being the first and second actuator being also coordinated in the same manner described above in this case, but producing the movement of the stroke end 54 and of the row 2 of displaceable elements 20 in the same direction but at different velocity. In this example the increase of the accumulation area is produced without moving the second portion 52 of the spacer guide 50 but moving the stroke end 54 away from said second portion 52 increasing the storage capacity of said accumulation area.

It will be understood that various parts of one embodiment of the invention can be freely combined with parts described in other embodiments, even being said combination not explicitly described, provided there is no harm in such combination.

The invention claimed is:

1. A foldable structure for a sunshade, a shutter or a fence, comprising:

at least one guiding member defining a guiding path;

a plurality of displaceable elements slidably connected to the at least one guiding member in succession forming a row of displaceable elements;

a stroke end limiting the movement of the displaceable elements on one end of the guiding path;

a first actuator connected to one of the displaceable elements of the row of displaceable elements spaced from the stroke end to produce the sliding movement of one of the displaceable elements in a folding direction and in an unfolding direction following the guiding path;

a spacer device comprising:

foldable spacers connecting adjacent displaceable elements of the row of displaceable elements to each other keeping the adjacent displaceable elements at a distance, each of the foldable spacers being movable between a first folding position determining a first distance between the adjacent displaceable elements and a second folding position determining a second distance between the adjacent displaceable elements smaller than the first distance, and a spacer guide comprising successive first portion, second portion, third portions, the first portion is parallel to the guiding path and is configured to guide and retain the foldable spacers in the first folding position, and the third portion is adjacent to the stroke end and is configured to guide and retain the foldable spacers in the second folding position, determining an accumulation area adjacent to the stroke end where at least one of the displaceable elements of the row of displaceable elements are accumulated in a folded position;

each of the foldable spacers comprises a first arm freely articulated to one of the displaceable elements and a second arm freely articulated to an adjacent one of the displaceable elements of the row of displaceable elements, the first and second arms being freely articulated to each other;

the second portion of the spacer guide is configured to guide and urge the foldable spacers from the first folding position to the second folding position during the driving produced by the first actuator in the folding direction and from the second folding position to the first folding position during the driving produced by the first actuator in the unfolding direction; and a second actuator produces a relative movement between the second portion of the spacer guide and the stroke end to adjust the longitude of the third portion to the number of displaceable elements accumulated in the accumulation area, the second actuator being in coordination with the first actuator.

2. The foldable structure according to claim 1 wherein the second portion is a cam and each of the foldable spacers includes a cam follower complementary to the cam.

3. The foldable structure according to claim 2 wherein the cam follower is located on the articulation between the first and second arms.

4. The foldable structure according to claim 2 wherein the first portion and the third portions are parallel to the guiding path and the second portion connects the first and third portions through a ramp non-parallel to the guiding path.

5. The foldable structure according to claim 1 wherein the second portion and the first and the third portions adjacent to the second portion are included in a movable spacer guide, the movable spacer guide being slidably guided in a direction parallel to the guiding path and being actuated by the second actuator.

6. The foldable structure according to claim 5 wherein a portion of the first portion and/or a portion of the third portion is/are telescopically connected to the movable spacer guide.

7. The foldable structure according to claim 1 wherein the coordination between the first actuator and the second actuator determines that a first lapse of time required by the first actuator to move one of the displaceable elements connected thereto a distance equivalent to the difference between the first distance and the second distance is equal to a second lapse of time required by the second actuator to produce a relative movement between the second portion and the stroke end the second distance.

8. The foldable structure according to claim 7 wherein the first actuator and the second actuator are coordinated through a gear box, or through a gear transmission interconnecting the first and second actuators, or are two different actuators coordinated through an electronic coordination.

9. The foldable structure according to claim 1 wherein the displaceable elements are elongated in a direction transverse to the guiding path or are slats.

10. The foldable structure according to claim 9 wherein the foldable structure further comprises a drive shaft parallel to or integral of the at least one guiding member and each of the displaceable elements is an orientable slat connected to the drive shaft through a sliding carriage which comprises a transmission configured to produce a rotation of the slat in response to a rotation of the drive shaft.

11. The foldable structure according to claim 1 wherein the at least one guiding member comprises two parallel guiding members separated from each other, each of the displaceable elements being supported on the two parallel guiding members on two opposed ends thereof.

12. The foldable structure according to claim 11 wherein the parallel guiding members include the first actuator and the spacer device connected to the two opposed ends of the displaceable elements supported between the two parallel guiding members.

13. The foldable structure according to claim 1 wherein the displaceable elements project symmetrically on both sides of the at least one guiding member.

14. The foldable structure according to claim 1 wherein the at least one guiding member and the guiding path defined by the at least one guiding member are curved.

15. The foldable structure according to claim 3 wherein the first portion and the third portion are parallel to the guiding path and the second portion connects the first and third portions through a ramp non-parallel to the guiding path.

* * * * *